United States Patent [19]

Mueller

[11] Patent Number: 4,586,210
[45] Date of Patent: May 6, 1986

[54] ROTATION BRUSH MECHANISM WITH SPEED CONTROL GOVERNOR

[76] Inventor: John L. Mueller, 824 E. Fern Dr. S., Phoenix, Ariz. 85014

[21] Appl. No.: 710,124

[22] Filed: Mar. 11, 1985

[51] Int. Cl.⁴ .............................................. A46B 13/06
[52] U.S. Cl. .................................................. 15/29
[58] Field of Search ...................... 15/24, 28, 29, 49 R, 15/50 R, 97 R, 387, 389; 51/170 T

[56] References Cited

U.S. PATENT DOCUMENTS 2,759,208  8/1956  Williams .................................. 15/29
3,153,799  10/1964  Williams .................................. 15/29
3,909,875  10/1975  Rother et al. ......................... 15/29 X Primary Examiner—Edward L. Roberts
Attorney, Agent, or Firm—Cahill, Sutton & Thomas

[57] ABSTRACT

A washing apparatus includes a centrifugal brake mechanism that limits a rotating speed of a rotary head supporting a ring of bristles, and also includes a mechanism which brings vanes of the rotary head into alignment with a high pressure water jet when the bristles of the washing apparatus are pressed against a surface to be washed. The device prevents excessive amounts of water from being thrown outward by the rotating bristles, yet is small enough to allow scrubbing of hard-to-reach portions of, for example, a car surface.

8 Claims, 8 Drawing Figures

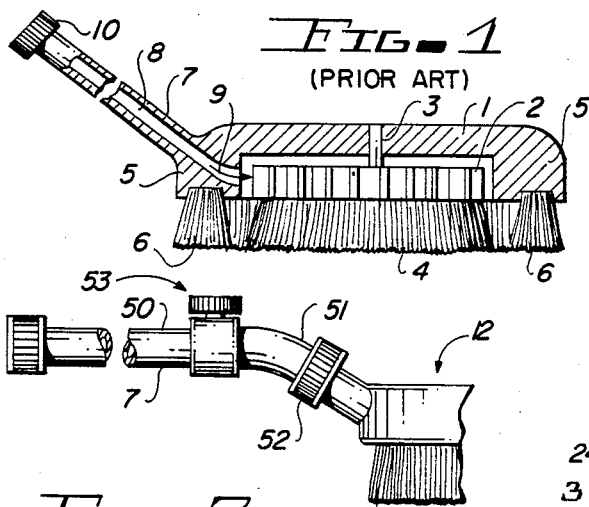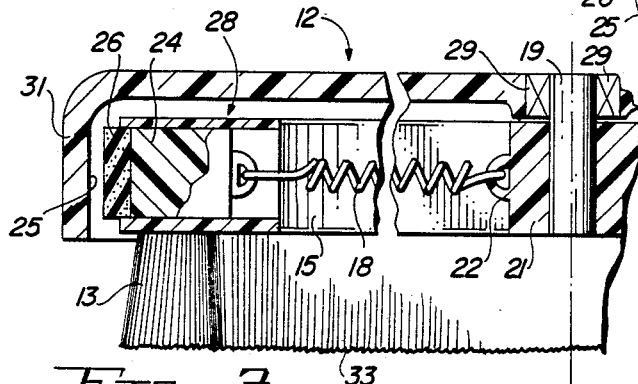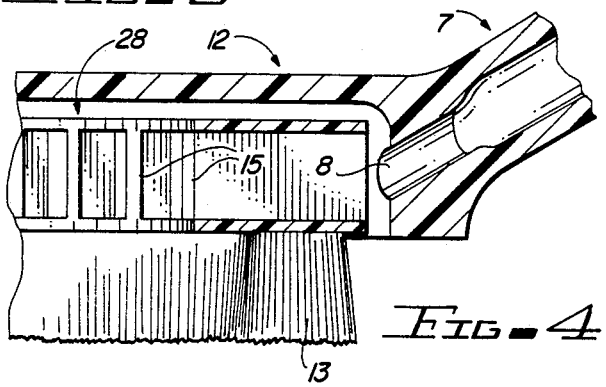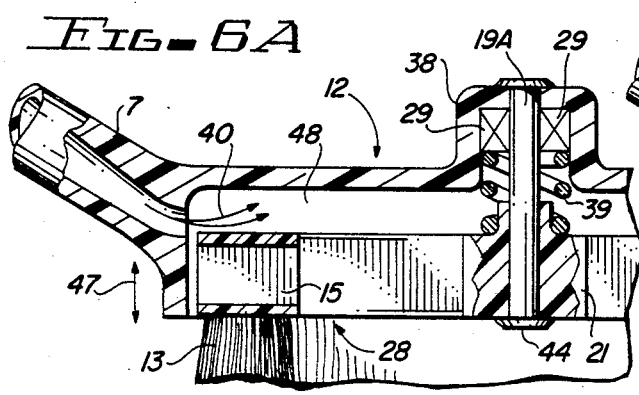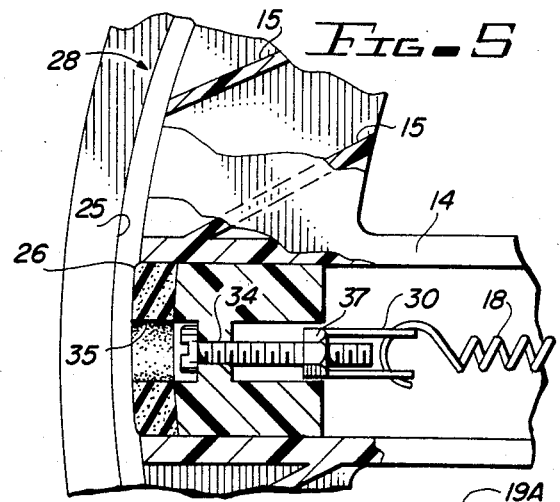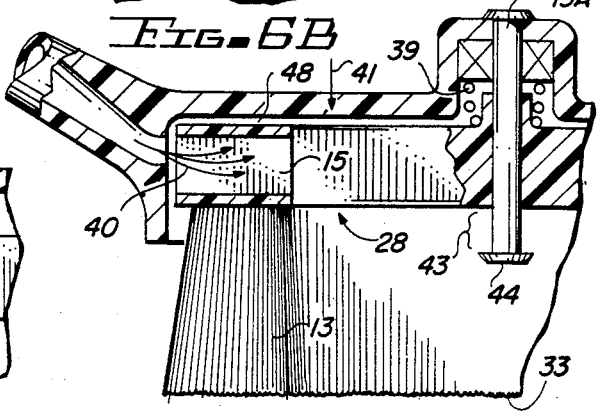

ROTATION BRUSH MECHANISM WITH SPEED CONTROL GOVERNOR

BACKGROUND OF THE INVENTION

The invention relates to inexpensive portable washing devices of the type having a handle connected to a water hose and having a ring of bristles mounted on a rotary head powered by turbine vanes, and more particularly to mechanisms which limit rotating speed of the ring of bristles to prevent water from being thrown rapidly outward and soaking the user.

A variety of inexpensive car washing devices of the type connectable to an ordinary garden hose and providing a rotary head supporting scrubbing bristles and powered by a jet of water produced by pressurized water delivered by the hose are known. Such devices commonly include a reservoir for detergent. Some include a control valve disposed in the handle of the device. U.S. Pat. Nos. 4,207,640; 4,151,624; 4,290,160; 4,461,052 are exemplary of the state of the art for such cleaning devices. FIG. 1 herein shows a typical prior art device, in which a housing 1 includes a recess in which a rotary head with vanes for receiving a pressurized jet of water 9 is mounted by means of a bearing 3 and supports a scrubbing bristle ring 4. A garden hose is attached by means of a hose connector 10 at the end of a handle 7 which includes a water passage 8 that guides the pressurized water through an orifice to produce the jet of water 9 which impinges upon the vanes of the rotary head 2. This particular device includes a stationary ring of peripheral bristles 6 attached to the outer bottom surface of housing 1. Peripheral bristles 6 act as a skirt that mainly performs the function of preventing excessive outward spraying of water from rotary bristle ring 4 as it rotates at high speed and thereby prevents the user from being soaked as he or she attempts to use the device to wash a car. Other prior art devices include plastic skirts which perform the same function as peripheral bristles 6 to prevent the user from being sprayed with water.

All of the comparable prior art devices suffer from the shortcoming that either they have a peripheral skirt or peripheral bristles which confine the amount of water that is thrown outward so that the user will not get soaked when using the device, in which case the overall size of the head is too large to allow effective scrubbing of portions of the surface of an automobile that are hard to reach, for example between the radio antenna and the adjacent surface metal, or elements of the automobile's grill, or portions of the surface near the bumpers, etc.

Despite the large number of prior inexpensive washing devices of the type described above that are available or have been proposed, there remains an unmet need for an inexpensive, washing device that (1) provides enough power to rotary bristles to adequately scrub the surface of an automobile or other object, (2) does not spray excessive amounts of water on the user during use, especially when the bristles are temporarily lifted off the surface being washed (causing the bristles to rotate much faster and thereby throw more water outwardly), and (3) is small enough to allow the bristles to be easily pressed against hard-to-get-at surfaces of the automobile or other object so that the user does not need to use another implement, such as a rag, to wash such hard-to-get-at surfaces in a separate operation.

SUMMARY OF THE INVENTION

It is an object of the invention to provide an inexpensive portable washing device that is connectable to a garden hose and which eliminates the peripheral skirt of prior similar devices, and yet does not radially throw excessive amounts of water on the user.

Briefly described, and in accordance with one embodiment thereof, the invention provides a portable, inexpensive washing apparatus that includes a centrifugal brake mechanism which acts as a governor to limit the rotary speed of a rotary head and a ring of scrubbing bristles attached thereto, in order to limit the amount of water which is sprayed outward by the bristles when they are lifted from the surface to be washed, and yet does not reduce the amount of power applied to the ring of bristles when they are pressed against the surface to be scrubbed. In the described embodiment of the invention, a pair of brake elements having surfaces which frictionally engage an inner cylindrical surface of a housing of the washing apparatus when the rotary bristle head reaches a certain rotary speed act to prevent further increases in the rotary speed thereof. When the rotary bristle head speed is reduced by pressing the bristles of the apparatus against the surface to be washed, full power is applied to the rotary head and ring of bristles thereon by virtue of a pressurized water jet striking vanes of the rotary head. In one described embodiment of the invention, the rotary head is mounted slidably on an axial pin about which the rotary head rotates and is urged downward by a bias spring moving the vanes of the rotary head out of alignment with the high pressure, fan-shaped water jet when the bristles are not being pressed against a surface to be washed. When the car washing apparatus is deployed so that its bristles are pressed against a surface to be washed, the rotary head slides upward along the axial pin all the way into the recess of the housing, bringing the vanes into alignment with the high pressure jet of water and thereby applying power to the rotary head to cause rotation of the bristles.

BRIEF DESCRIPTION OF THE DRAWINGS

FIG. 1 is a section diagram illustrating a prior art rotary brush apparatus.

FIG. 2 is a partial cut-away section view of a rotary brush mechanism of the present invention.

FIG. 3 is a partial section view taken along section line 3—3 of FIG. 2.

FIG. 4 is a partial cut-away section view taken along section line 4—4 of FIG. 2.

FIG. 5 is a partial section view illustrating a spring tension adjustment mechanism that can be used in the device of FIG. 2.

FIG. 6A and 6B are partial section views useful in describing the structure and operation of an alternate embodiment of the invention.

FIG. 7 is a diagram showing a handle structure for the rotary brush apparatus of the invention.

DESCRIPTION OF THE INVENTION

Referring now to FIGS. 2-4 reference numeral 12 designates the housing of the rotary brush of the present invention. Housing 12 is attached to a handle 7, as in FIG. 1, through which a high speed stream of water is directed to an orifice 8 to produce a high speed jet of water 9 which impinges upon vanes 15 of a rotary bristle head 28. A peripheral ring of bristles 13 is attached to the bottom surface of rotary bristle head 28. Bristle head 28 rotates in the direction indicated by arrow 32 in FIG. 2.

Bristle head 28 includes a pair of hollow spokes 14 each attached at its inner end to a hub 21 through which an axle pin 19 extends. Suitable bearings such as 29 can be provided either in the housing 12 and/or in the hub 21 to provide low friction rotation.

In accordance with the present invention, a centrifugal brake speed governor mechanism is provided in which two brake shoes 24 are slidably disposed in recesses 46 (FIG. 2) in outer opposed portions of rotary bristle head 28, so that the brake shoes 24 can move outward in the directions indicated by arrows 33 when the rotation speed of bristle head 28 rotates.

Brake pads 26 are disposed on the outer surface of brake shoes 24, and, when the maximum permissible speed of bristle head 28 is achieved, they frictionally rub an inner surface 25 of housing 12, which acts as a brake drum surface, thereby preventing further increases in rotation speed.

At low speeds, brake shoes 24 are pulled inward into the recesses 46 by a pair of opposed springs 18, which have their outer ends connected to loops 22 attached to the hub 21 and are connected up to the outer ends of the brake shoes 24 by means of loops 30. Reference numeral 30 designates side walls of housing 12, the inner surfaces of which are the "brake drum" surfaces 25.

Various techniques can be provided for adjusting the tension of springs 18 so that the speed-governing function occurs at the desired rotation speed of bristle head 28, at which amounts of water thrown outwardly by bristles 13 are not excessive, even when the bristles are lifted from the surface 33 to be washed. FIG. 5 shows one tension adjusting mechanism in which an adjustment screw 34, accessible through a hole in the center of brake shoe 26, adjusts the radial position of loop 30 to which the outer end of spring 18 is connected, thereby adjusting the spring tension and hence the limiting speed of rotary bristle head 28. Similar mechanisms, accessible from the bottom of the bristle head 28, for adjusting the tension of the springs 18 from their respective inner ends, could be easily provided by one skilled in the art.

Ordinarily, the housing 12 and the rotary bristle head 28 would be made of plastic. The brake pads 26 could be composed of plastic that is integral with the brakeshoes 24. The metal components, such as the spring and the bearings, could be composed of suitable rust resistant metal, such as stainless steel.

Referring now to FIGS. 6A and 6B, an alternate embodiment of the invention is shown, wherein the rotary bristle head 28 is mounted on an axle pin 19A having a lower rataining head 44. Bristle head 28 is rotatably supported on axle pin 19A so that bristle head 28 can freely slide vertically in the directions indicated by reference numeral 47. A compression coil spring 39 is disposed about the upper portion of axle pin 19A, which is imbedded in a raised portion 38 of the upper surface of housing 12. The lower end of compression coil spring 39 abuts the upper surface of rotary head 28. The upper end of the coil spring 39 engages a low friction bearing 29 which allows spring 39 to rotate freely with rotary bristle head 28. When bristles 13 are not being pressed against a surface to be washed, bristle head 28 is in the configuration shown in FIG. 6A, being retained on axle pin 19A by head 44. Under these conditions, the vanes 15 of rotary bristle head 28 are positioned below the pressurized water jet 40 emerging from the nozzle at the inner end of handle 7, and do not cause much, if any, rotation of bristle head 28. However, when the user exerts a downward force on handle 7, pressing bristles 13 against the surface 33 to be washed, the bristle head 28 is pushed all the way upward into the recess 48 of housing 12, sliding along axle pin 19A, compressing spring 39, and bringing the vanes 15 into alignment with the water jet 40, causing full power to be applied to the rotary bristle head 28. The water jet 40 can be fan-shaped, if an enlongated nozzle aperture is provided therefor, so that the application of power from water jet 40 to vanes 15 is gradually increased as the bristle head 28 is pushed further up into recess 48.

If desired, the centrifugal brake governor mechanism of FIGS. 2–4 can be combined with the receding rotary head of FIGS. 6A and 6B, in which case the speed of the governing mechanism will perform the function of limiting rotary speed of the bristle head 28 under conditions in which the ring of bristles 13 are being pressed only lightly against the surface 33, with sufficient force to bring the vanes 15 into alignment with water jet 40, but not with enough force to reduce the rotary speed of the bristle head 28 enough to prevent water from being centrifugally thrown outward by the rotating bristles 13 and thereby prevent the user from being soaked.

In FIG. 7, handle 7 is shown with two bends 50 and 51 which result in the outer end of handle 7 being at an angle which is very convenient for use of the washing apparatus to wash a car. Reference numeral 52 designates a coupling which allows head 12 to be removed from handle 7. A number of different sized and/or different types of removable heads can be provided, and a shut-off valve 53 can be provided in handle 7 to allow the different sized heads to be easily interchanged during a particular washing operation.

While the invention has been described with reference to a particular embodiment thereof, those skilled in the art will be able to make various modifications to the described embodiments of the invention without departing from the true spirit and scope thereof. It is intended that all devices which are equivalent to the embodiments of the invention shown in that they perform substantially the same function in substantially the same way to achieve substantially the same result are to be encompassed within the invention. For example, a variety of different equivalent centrifugal brake mechanisms could be provided by those skilled in the art. Conventional liquid detergent dispensers selectively actuatable by the user can be easily provided in the handle or in the housing, and therefore are not disclosed or described. Various planetary or other gear reduction means could be provided to translate rotation from a high speed impeller to a lower speed rotary bristle head. Other means for adjusting the tension in the springs could be provided by those skilled in the art.

I claim:

1. A cleaning apparatus for connection to a hose containing pressurized fluid, said cleaning apparatus comprising, in combination:
    (a) a housing having a recess therein, a handle attached to the housing, means for connection to the hose, and an orifice in open communication with the hose connecting means and producing a high velocity jet of fluid into the recess;
    (b) rotary bristle supporting means rotatably disposed in the recess, and having a bottom surface, for supporting a ring of bristles which are attached to the bottom surface;

(c) means including a plurality of vanes for receiving the jet of fluid to produce rotation of the rotary bristle supporting means; and (d) centrifugal braking means disposed in said rotary bristle supporting means for frictionally engaging an interior surface of said housing in said recess when the rotary speed of the centrifugal braking means exceeds a predetermined level, to thereby prevent excessive amounts of fluid from being thrown radially outward from the cleaning apparatus by the rotating ring of bristles.

2. The cleaning apparatus of claim 1 wherein said inner surface is a cylindrical surface acting as a brake drum for frictional engagement by a braking surface of the centrifugal braking means.

3. The cleaning apparatus of claim 2 wherein said centrifugal braking means includes two brake shoe blocks slidably disposed in diametrically opposed recesses in said rotary bristle supporting means and first and second tension springs connected, respectively, to said two brake shoe blocks urging them radially inwardly in the diametrically opposed recesses and preventing them from frictionally engaging the inner cylindrical surface of the recess until the rotary speed of the rotary head reaches the predetermined level.

4. The cleaning apparatus of claim 3 wherein a peripheral portion of the housing supports the inner cylindrical surface, and wherein the ring of bristles extends substantially below a lower edge of the peripheral portion, so that if the rotary speed of the ring of bristles exceeds the predetermined level, excessive amounts of fluid would be sprayed radially outward from the bristles.

5. The cleaning apparatus of claim 4 wherein the peripheral portion of the housing is relatively thin.

6. The cleaning apparatus of claim 5 wherein the centrifugal braking means includes means for adjusting the tension of the first and second springs.

7. The cleaning apparatus of claim 5 including an axle pin attached in a fixed relationship to an upper surface of the housing, and including bearing means for supporting the rotary bristle supporting means slidably on the axle pin, the rotary bristle supporting means including said plurality of vanes, said vanes being generally radial, peripheral vanes against which the jet of fluid impinges, the peripheral vanes being aligned with the jet of fluid when the rotary bristle supporting means is positioned at a highest first position in the recess, and wherein the vanes are not aligned with the jet of fluid when the rotary bristle supporting means is slid along the axle pin to the lowest position thereon, the cleaning apparatus including compression spring means for urging the rotary bristle supporting means to the lowest position except when the bristle ring is pressed against a surface to be cleaned by pressing the housing towards the surface to be cleaned, compressing the compression spring, and forcing the rotary bristles supporting means up into the recess.

8. A cleaning apparatus for connection to a hose containing pressurized fluid, said cleaning apparatus comprising, in combination:

(a) a housing having a recess thereing, a handle attached to the housing, means for connecting the housing to the hose, and an orifice in open communication with the hose connecting means for producing a high velocity jet of fluid in the recess;

(b) rotary bristle supporting means rotatably disposed in the recess and having a bottom surface, for supporting a ring of bristles which are attached to the bottom surface;

(c) means including a plurality of vanes and attached to the rotary bristle supporting means for receiving the jet of fluid to produce rotary motion of the rotary bristle supporting means; and (d) axle means for axially, rotatably, slidably supporting the rotary bristle supporting means between upper and lower positions on the axle means, and compression spring means disposed between an upper surface of the rotary bristle supporting means and the housing for urging the rotary bristle supporting means to a lower position on the axle means, the vanes being aligned with the jet of fluid when the rotary bristle supporting is in the upper position and being non-aligned with the jet of fluid when the rotary bristle supporting means is at the lower position.

* * * * *